US010220696B2

(12) United States Patent
Uezu

(10) Patent No.: US 10,220,696 B2
(45) Date of Patent: Mar. 5, 2019

(54) VEHICLE AND ENGINE UNIT

(71) Applicant: Yamaha Hatsudoki Kabushiki Kaisha, Shizuoka-ken (JP)

(72) Inventor: Junji Uezu, Shizuoka (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 15/815,720

(22) Filed: Nov. 17, 2017

(65) Prior Publication Data

US 2018/0141425 A1 May 24, 2018

(30) Foreign Application Priority Data

Nov. 18, 2016 (JP) ................................ 2016-225035

(51) Int. Cl.

| | |
|---|---|
| ***B60K 5/12*** | (2006.01) |
| ***B60F 3/00*** | (2006.01) |
| ***B60K 17/342*** | (2006.01) |
| *B60K 17/06* | (2006.01) |
| *F02F 7/00* | (2006.01) |
| *F16C 3/12* | (2006.01) |
| *B62D 21/18* | (2006.01) |

(52) U.S. Cl.

CPC ............ *B60K 5/1283* (2013.01); *B60F 3/003* (2013.01); *B60K 17/342* (2013.01); *B60K 17/06* (2013.01); *B62D 21/183* (2013.01); *F02F 7/0046* (2013.01); *F16C 3/12* (2013.01)

(58) Field of Classification Search

CPC .......... B63H 5/00; B60K 5/12; B60K 5/1283; B60K 15/342; B60F 3/003; B62D 21/183

USPC ............ 123/334, 337, 195 A, 195 R, 195 P, 123/196 CP, 196 W

See application file for complete search history.

(56) References Cited

U.S. PATENT DOCUMENTS

| | | | | |
|---|---|---|---|---|
| 4,718,510 A * | 1/1988 | Ito | G01P 1/04 | 180/54.1 |
| 4,949,587 A * | 8/1990 | Oka | F16D 7/027 | 192/55.1 |
| 5,197,910 A * | 3/1993 | Kanno | B63H 20/08 | 440/89 A |
| 6,544,083 B1 * | 4/2003 | Sawyer | B63H 23/08 | 192/21 |
| 6,904,889 B2 * | 6/2005 | Matsuda | F02B 61/045 | 123/195 A |

(Continued)

FOREIGN PATENT DOCUMENTS

| | | |
|---|---|---|
| JP | H10-297294 A | 11/1998 |
| JP | 2009-203960 A | 9/2009 |
| JP | 2010-188992 A | 9/2010 |

*Primary Examiner* — John Kwon
*Assistant Examiner* — Johnny H Hoang
(74) *Attorney, Agent, or Firm* — HEA Law PLLC

(57) ABSTRACT

A vehicle includes, an engine including a crankshaft, a crankcase which is configured to accommodate the crankshaft therein, and a centrifugal clutch which is arranged coaxially with the crankshaft, and a propeller shaft to which rotational power output from the engine and changed in speed is transmitted, the propeller shaft passing through the crankcase and intersecting the crankshaft in plan view, at least a part of the propeller shaft being located between the centrifugal clutch and a support wall portion of the crankcase configured to support the crankshaft and above a lower end of the centrifugal clutch.

19 Claims, 8 Drawing Sheets

(56) References Cited

U.S. PATENT DOCUMENTS 8,281,891 B2 * 10/2012 Sugiura .................... B60K 5/04
180/251
2013/0087403 A1 * 4/2013 Itoo .................... F16H 57/0416
180/339
2016/0082833 A1 * 3/2016 Mitsubori .............. B60K 17/08
180/383

* cited by examiner 110
112
111
105
25
23
21
20
50
10
105
112
111
110

50
52
21c
21
211
283
285
69
215
415
413
495
41
54
41c
493
F 21
21A
21B
78
52
289
239
218
211
20
218
219
69
218
219
218
63a
69
61a
63
61
63
63a
615
60
63a
65
63
63a
61a
65
61a
65
63
65
65
65
F 21
21A
21B
78
52
289
239
20
63a
67
67
211
615
63
63a
63
61
63a
63a
63a
68
63
60
65
68
63
43
413
419
418
418
41
41A
41B
F
541

VEHICLE AND ENGINE UNIT

CROSS-REFERENCE TO RELATED APPLICATION

The present application claims priority from Japanese application JP 2016-225035 filed on Nov. 18, 2016, the content of which is hereby incorporated by reference into this application.

FIELD OF THE INVENTION

The present application relates to a vehicle and an engine unit.

BACKGROUND OF THE INVENTION

In a vehicle for use in rough terrain, which is called a recreational off-highway vehicle (ROV), unlike in a general automobile, an engine may be arranged below a seat or a cargo bed. Accordingly, a position and a size of the engine affect not only a center of gravity of the vehicle but also a height of the seat or the cargo bed.

SUMMARY OF THE INVENTION

Hitherto, the applicant of the present application has grappled to lower a center of gravity of a vehicle for use in rough terrain by reducing a height of an engine in the vehicle.

In Japanese Patent Application Laid-open No. Hei 10-297294, a propeller shaft (referred to as “drive shaft” in this patent literature) is caused to pass through a crankcase. The propeller shaft in the crankcase is located below a centrifugal clutch arranged coaxially with a crankshaft. However, in this configuration, it is necessary to separate the crankshaft and the propeller shaft from each other in an up-and-down direction so as to prevent contact between the propeller shaft and the centrifugal clutch. Thus, it is unavoidable to raise a position of an entire engine, with the result that a center of gravity of a vehicle cannot be lowered satisfactorily.

Further, in Japanese Patent Application Laid-open No. 2010-188992, a multiple-disc centrifugal clutch is arranged not in an engine but in a transmission. With this arrangement, a propeller shaft (referred to as “drive shaft” in this patent literature) in a crankcase is arranged closer to a crankshaft. However, in this configuration, the multiple-disc centrifugal clutch is used to transmit rotational power that has an increase in torque after a reduction in speed occurs. Accordingly, it is inevitable to increase a size of the centrifugal clutch as compared to a case of arranging the centrifugal clutch coaxially with the crankshaft. In addition, it is necessary to raise a layout position of the centrifugal clutch. Thus, it is unavoidable to raise a position of the engine, with the result that a center of gravity of a vehicle cannot be lowered satisfactorily.

The present application has been made to solve the above-mentioned problems, and has an object to provide a vehicle and an engine unit capable of lowering a center of gravity of a vehicle, by lowering a position of an engine.

According to one embodiment disclosed in the present application, there is provided a vehicle including an engine and a propeller shaft. The engine includes a crankshaft, a crankcase accommodating the crankshaft therein, and a centrifugal clutch arranged coaxially with the crankshaft. Rotational power, output from the engine and changed in speed, is transmitted to the propeller shaft. The propeller shaft passes through the crankcase and intersects the crankshaft in a plan view. At least a part of the propeller shaft is located between the centrifugal clutch and a support wall portion of the crankcase configured to support the crankshaft, and above a lower end of the centrifugal clutch.

Further, according to one embodiment disclosed in the present application, there is provided an engine unit including a crankshaft, a crankcase accommodating the crankshaft therein, a centrifugal clutch arranged coaxially with the crankshaft, and a first shaft. The first shaft passes through the crankcase and intersects the crankshaft in a plan view. At least a part of the first shaft is located between the centrifugal clutch and a support wall portion of the crankcase configured to support the crankshaft, and above a lower end of the centrifugal clutch.

According to the above-mentioned embodiment, the centrifugal clutch is arranged coaxially with the crankshaft, and the propeller shaft is located between the support wall portion of the crankcase and the centrifugal clutch and above the lower end of the centrifugal clutch. Accordingly, the position of the engine is lowered, thereby lowering a center of gravity of the vehicle.

Other objects and features of this invention will be in part apparent and in part point pointed out hereinafter.

BRIEF DESCRIPTION OF THE DRAWINGS

The following drawings illustrate examples of various components of the invention disclosed herein, and are for illustrative purposes only.

DETAILED DESCRIPTION OF THE INVENTION

While the present invention may be embodied in many different forms, several illustrative embodiments are described herein with the understanding that this disclosure is to be considered as providing examples of the principles of the invention and such examples are not intended to limit the invention to the preferred embodiments described herein and/or illustrated herein.

The terminology used herein is for the purpose of describing particular embodiments only and is not intended to be limiting of the invention. As used herein, the term “and/or” includes any and all combinations of one or more of the associated listed items. As used herein, the singular forms “a,” “an,” and “the” are intended to include the plural forms as well as the singular forms, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments.

Figure 1:
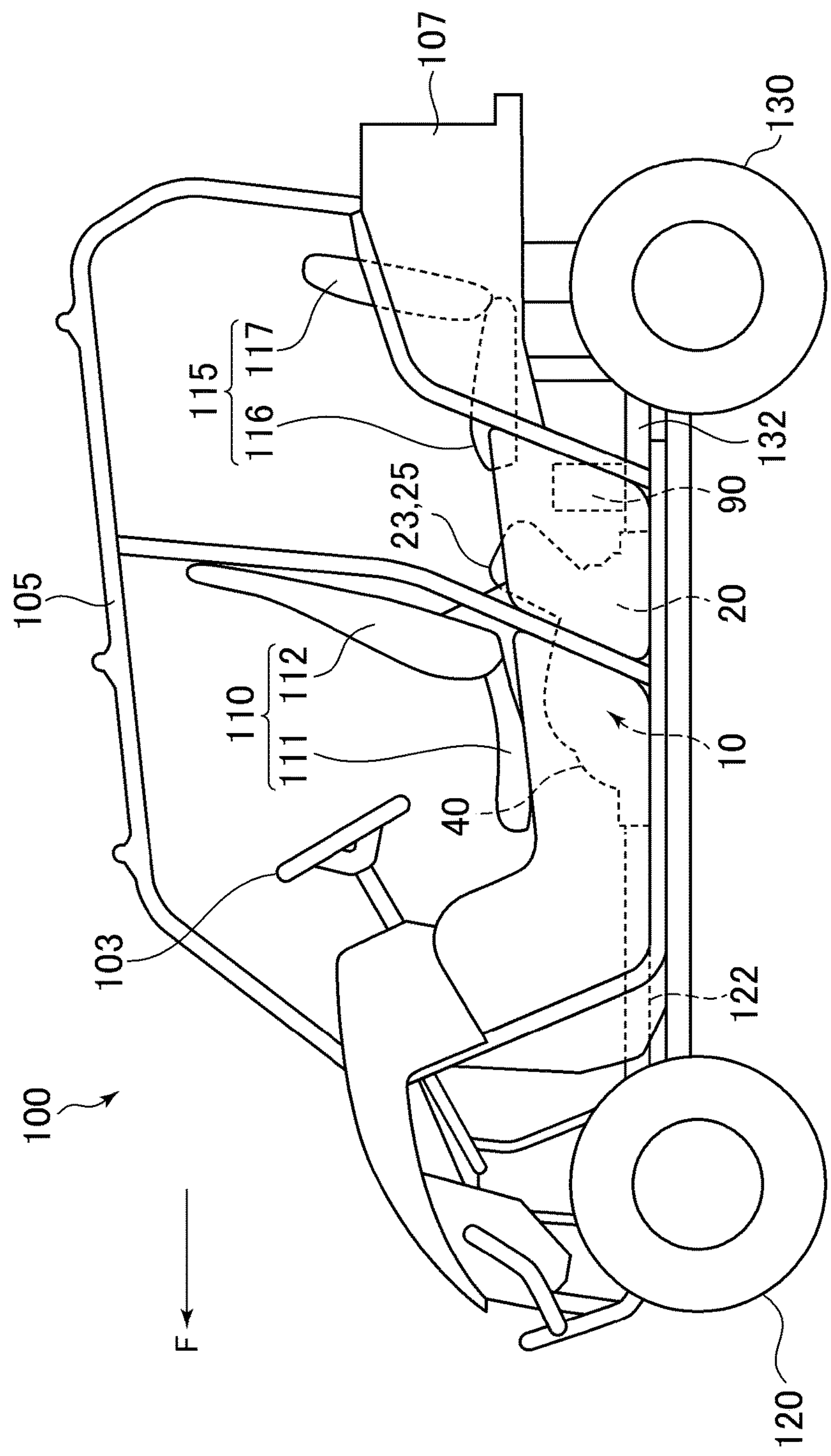
FIG. 1 is a left side view for illustrating a vehicle according to an embodiment of the vehicle.
Figure 2:
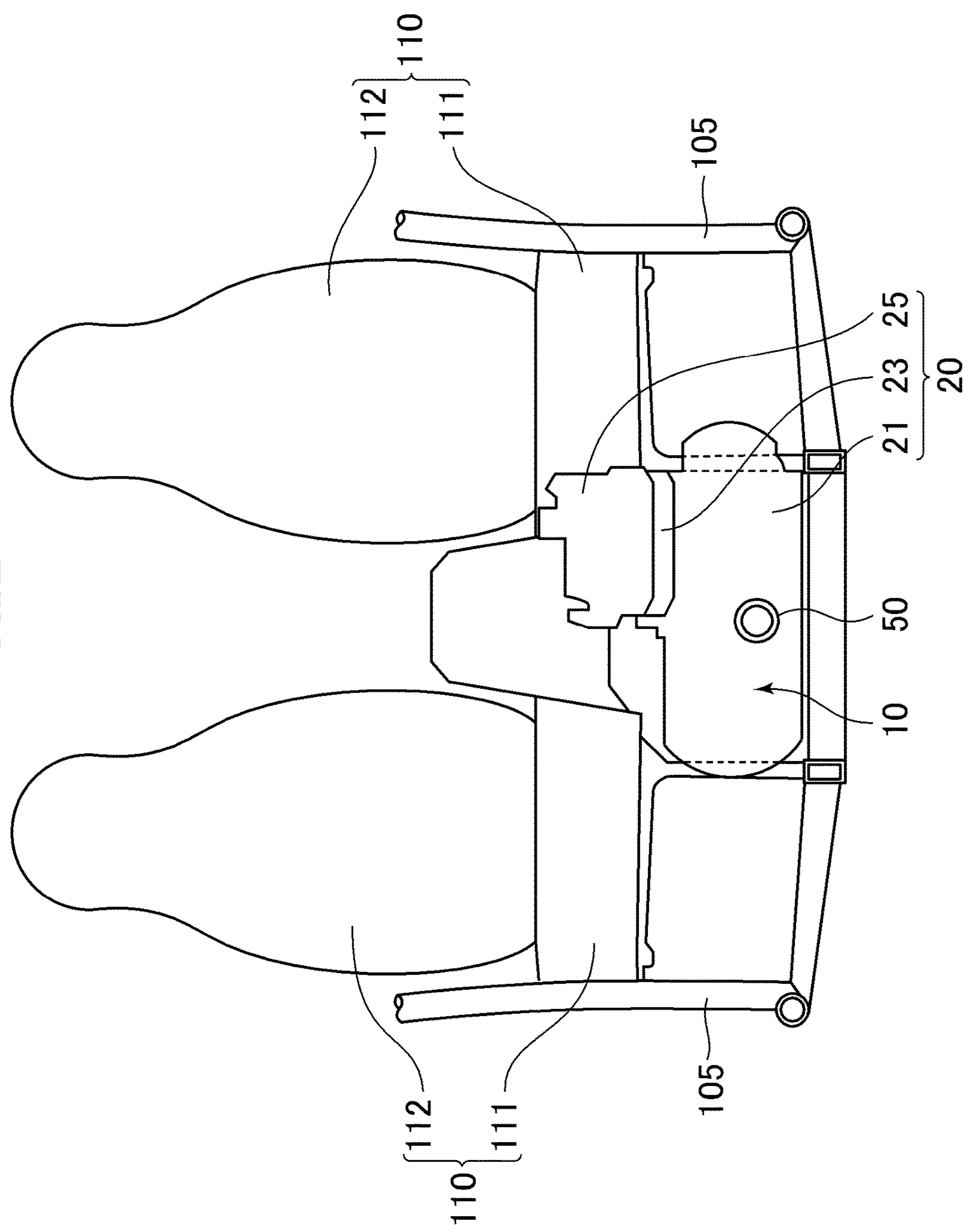
FIG. 2 is a back view for illustrating front row seats and a periphery thereof.

FIG. 1 is a left side view for illustrating a vehicle 100 according to an embodiment. FIG. 2 is a back view for illustrating front row seats 110 and a periphery thereof. In this embodiment, the vehicle 100 is a four-wheel-drive vehicle for use in rough terrain, which is called, for example, a recreational off-highway vehicle (ROV). Alternatively, the vehicle 100 may be a straddle-type four-wheel-drive vehicle including a steering bar, which is called, for example, an all terrain vehicle (ATV).

The arrow F in FIG. 1 indicates a forward direction of the vehicle 100. In the following description, a front side, a rear side, an upper side, a lower side, a left side, and a right side respectively refer to a front side, a rear side, an upper side, a lower side, a left side, and a right side of the vehicle seen toward a steering wheel 103 from a driver seated on one of the front row seats 110.

An engine unit 10 is arranged in a vicinity of a center of the vehicle 100 in a fore-and-aft direction and a right-and-left direction of the vehicle 100. A front propeller shaft 122 extends forward from the engine unit 10, and rotational power output from the engine unit 10 is transmitted to front wheels 120 through the front propeller shaft 122. A rear propeller shaft 132 extends rearward from the engine unit 10, and the rotational power output from the engine unit 10 is transmitted to rear wheels 130 through the rear propeller shaft 132. The front propeller shaft 122 and the rear propeller shaft 132 are coupled to a propeller shaft 50 (described later in detail) that passes through the engine unit 10 in the fore-and-aft direction.

The engine unit 10 includes an engine 20 arranged in a rear portion thereof, and a gear transmission 40 arranged in a front portion thereof. The engine 20 is, for example, a water-cooled four-cycle parallel two-cylinder engine. In the engine 20, a cylinder block 23 and a cylinder head 25 are arranged in inclined postures so as to be directed obliquely rearward and upward. The engine 20 is, for example, a dry sump engine, and a separate oil tank 90 is arranged behind the engine 20 to be coupled to the engine 20 through a pipe (not shown).

The plurality of front row seats 110 are arranged above or in a vicinity of the area above the engine unit 10 to be aligned in the right-and-left direction. The steering wheel 103 is arranged forward of the front row seats 110. A plurality of rear row seats 115 are arranged rearward of the front row seats 110 to be aligned in the right-and-left direction. A cabin frame 105 is arranged to surround a space for occupants in which the front row seats 110, the rear row seats 115, and the steering wheel 103 are contained. A cargo bed 107 is arranged rearward of the rear row seats 115 and above the rear wheels 130. The rear row seats 115 and the cargo bed 107 may be omitted.

The engine unit 10 is arranged so that at least a part of the engine unit 10 is located between the front row seats 110 and the rear row seats 115. Each of the front row seats 110 includes a seat portion 111 and a backrest portion 112, and each of the rear row seats 115 includes a seat portion 116 and a backrest portion 117. Specifically, at least a part of the engine 20, for example, the cylinder block 23 and the cylinder head 25 are located between the backrest portions 112 of the front row seats 110 and the seat portions 116 of the rear row seats 115.

Further, the engine unit 10 is arranged so that at least a part of the engine unit 10 is located below the front row seats 110. Specifically, the gear transmission 40 is located below the seat portions 111 of the front row seats 110. Apart of the engine unit 10 excluding the cylinder block 23 and the cylinder head 25 is located below the seat portions 111 of the front row seats 110. Further, the engine unit 10 is arranged so that the propeller shaft 50 (described later in detail) passing through the engine unit 10 itself in the fore-and-aft direction is located near the center of the engine unit 10 in the right-and-left direction. The engine unit 10 may be arranged below the rear row seats 115.

Figure 3:
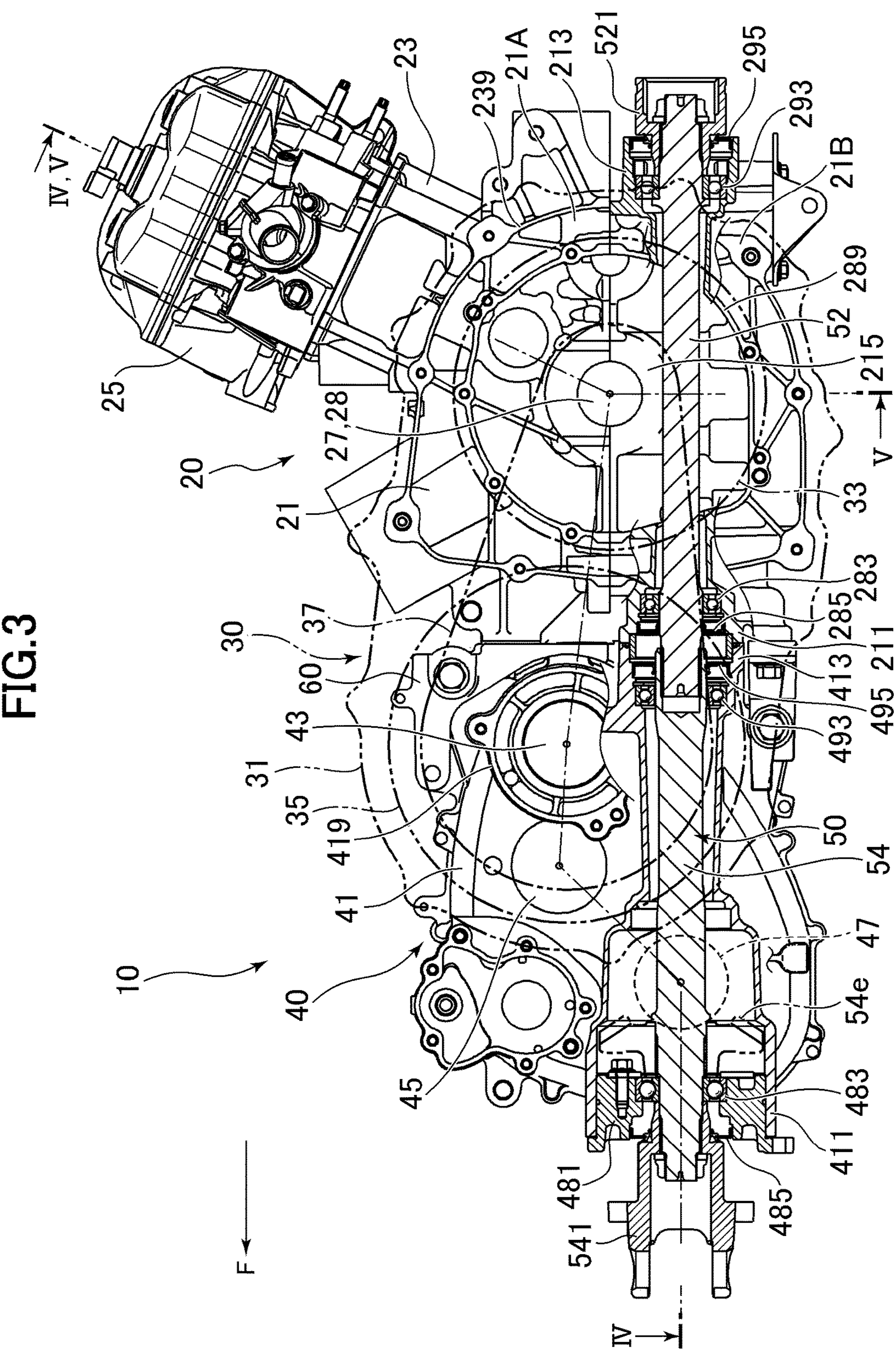
FIG. 3 is a left side view for illustrating an embodiment of an engine unit.

FIG. 3 is a left side view of the engine unit 10. In FIG. 3, the propeller shaft 50 and a periphery thereof are illustrated cut in an up-and-down direction of the vehicle along a plane passing an axis of the propeller shaft 50 (that is, cut along line III-III of FIG. 4).

Figure 4:
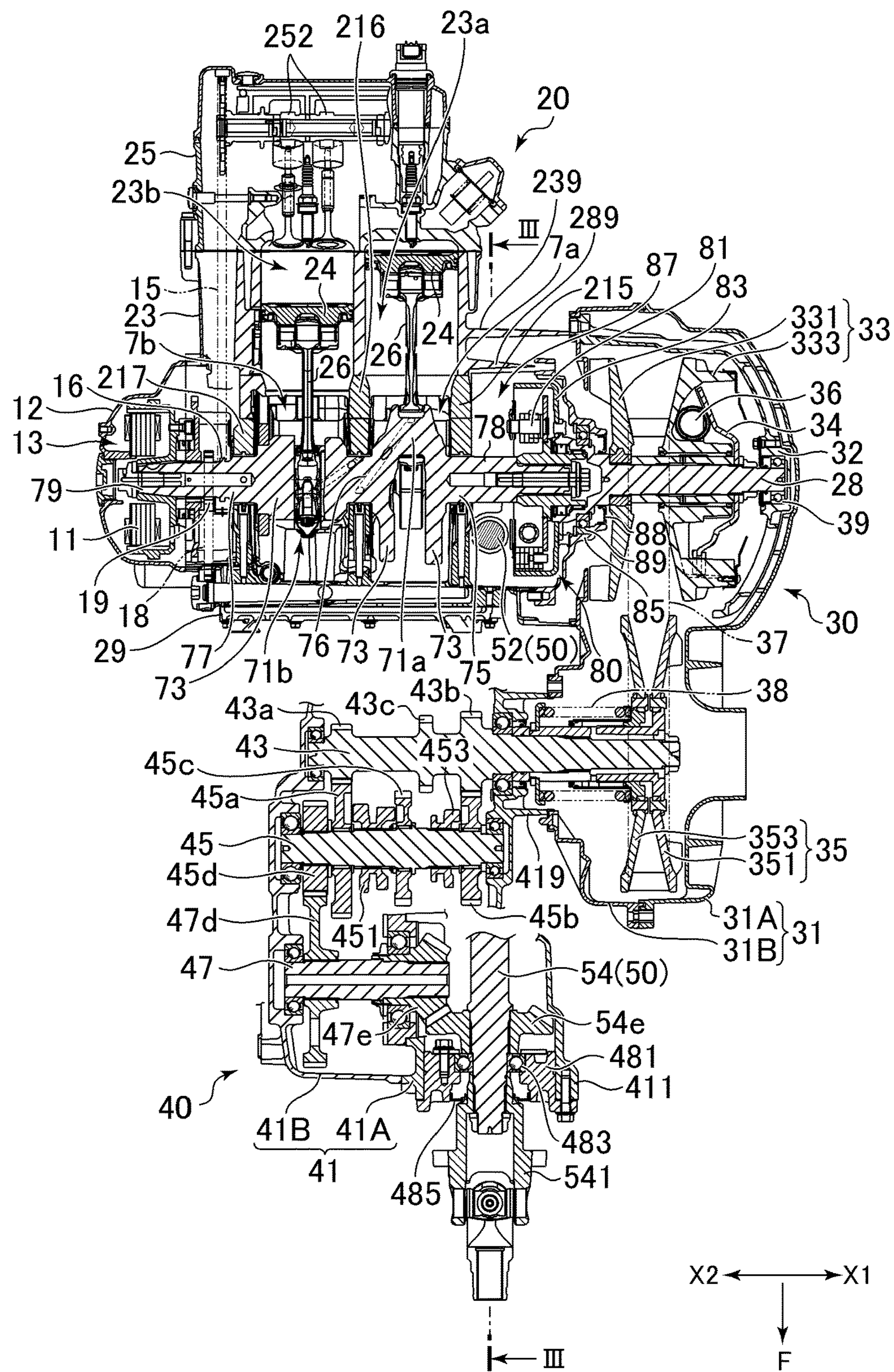
FIG. 4 is a developed sectional view for illustrating the engine unit.

FIG. 4 is a developed sectional view of the engine unit 10 taken along line IV-IV of FIG. 3. The line IV-IV is a polygonal line drawn by connecting a crankshaft 27, a secondary shaft 43, a transmission shaft 45, and an output shaft 47 in the stated order. The arrow X1 in FIG. 4 indicates a leftward direction, and the arrow X2 in FIG. 4 indicates a rightward direction (with respect to the forward direction F).

Figure 5:
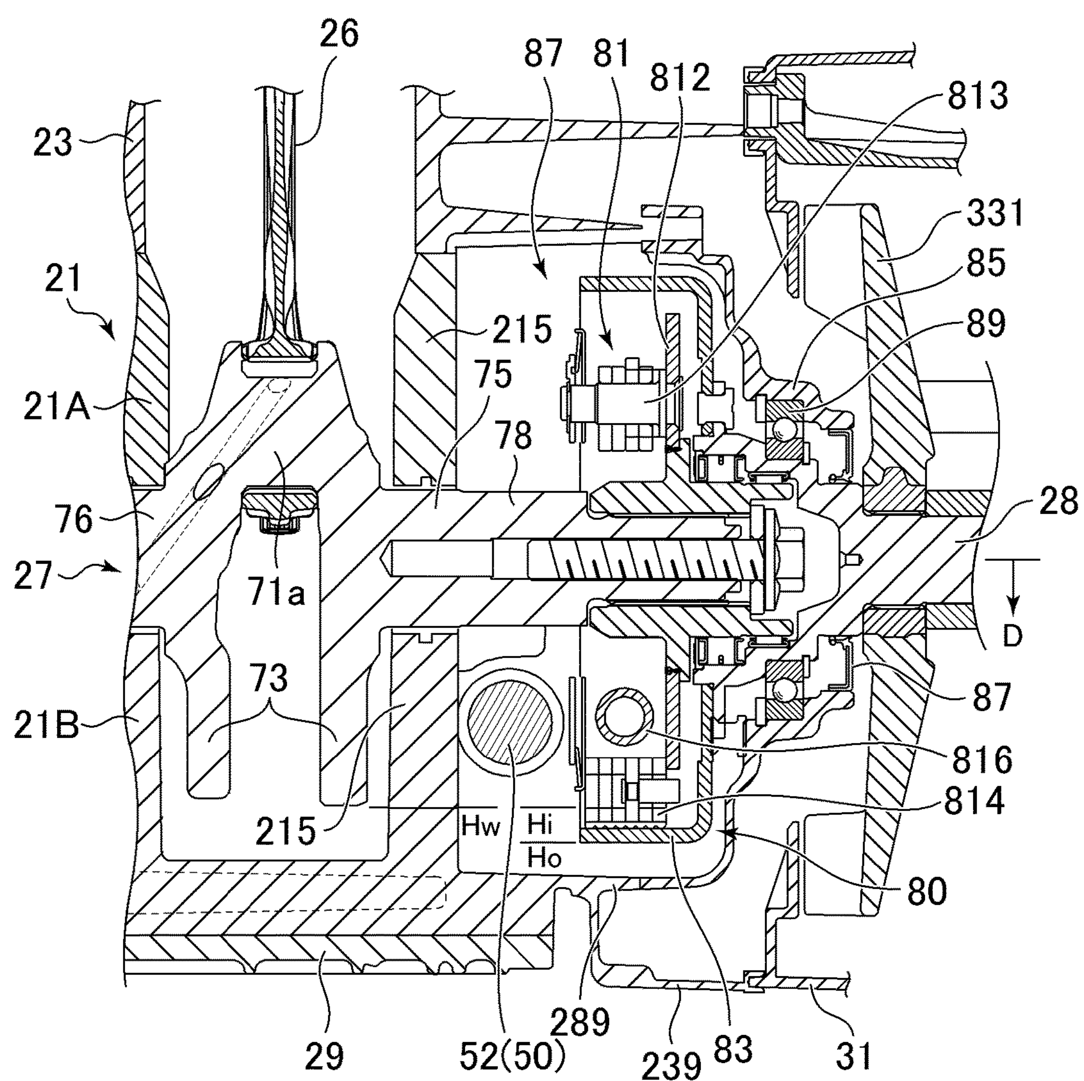
FIG. 5 is a sectional view for illustrating an embodiment of a main part of the engine unit.
Figure 6:
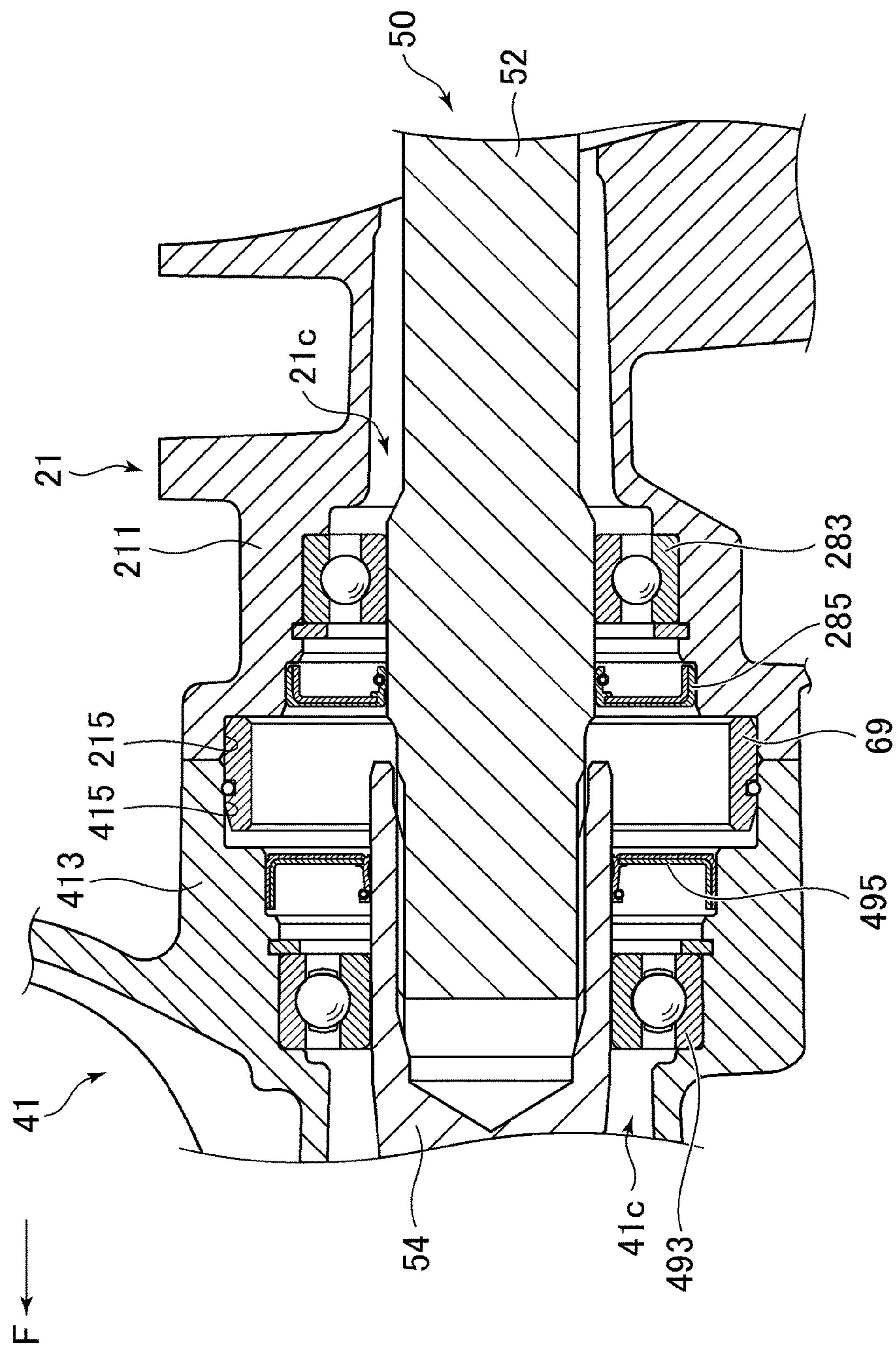
FIG. 6 is a sectional view for illustrating a main part of the engine unit.

FIG. 5 is an enlarged sectional view for illustrating the propeller shaft 50 and the periphery thereof when the engine unit 10 is cut along the line V-V of FIG. 3. FIG. 6 is an enlarged sectional view for illustrating a coupling region of the propeller shaft 50 of FIG. 4.

The engine unit 10 includes the crankshaft 27, the secondary shaft 43, the transmission shaft 45, and the output shaft 47 that extend in the right-and-left direction in parallel to one another. The crankshaft 27 is accommodated in a crankcase 21 of the engine 20. The secondary shaft 43, the transmission shaft 45, and the output shaft 47 are accommodated in a transmission case 41 configured to accommodate the transmission 40 therein. The crankcase 21 and the transmission case 41 are coupled to each other through intermediation of an adapter 60.

Further, the engine unit 10 includes the propeller shaft 50 extending in the fore-and-aft direction. The propeller shaft 50 is arranged below the crankshaft 27, the secondary shaft 43, and the transmission shaft 45 to be orthogonal to the crankshaft 27, the secondary shaft 43, and the transmission shaft 45 in a plan view. The propeller shaft 50 includes a rear shaft 52 passing through the crankcase 21 in the fore-and-aft direction, and a front shaft 54 passing through the transmission case 41 in the fore-and-aft direction. The rear shaft 52 and the front shaft 54 are coupled to each other.

The crankcase 21 includes an upper crankcase 21A and a lower crankcase 21B that are dividable in the up-and-down direction (direction perpendicular to an axis of the crankshaft 27) along a horizontal plane passing through the axis of the crankshaft 27. The cylinder block 23 is joined to an upper portion of the crankcase 21, and the cylinder head 25 is coupled to an upper portion of the cylinder block 23. An oil pan 29 is coupled to a lower portion of the crankcase 21.

Two cylinder bores 23*a* and 23*b* are formed in the cylinder block 23 to be aligned in the right-and-left direction. Pistons 24 and 24 are inserted into the cylinder bores 23*a* and 23*b*, respectively. The pistons 24 and 24 are coupled to the crankshaft 27 through connecting rods 26 and 26.

The crankshaft 27 includes left and right crankpins 71*a* and 71*b* to which the connecting rods 26 and 26 are coupled, respectively, crank webs 73, which are coupled together to sandwich each of the left and right crankpins 71*a* and 71*b* therebetween, and crank journals 75, 76, and 77, which are coupled to the crank webs 73.

An inside of the crankcase 21 is partitioned into two crank chambers 7*a* and 7*b* aligned in the right-and-left direction. The crankcase 21 includes three support wall portions 215, 216, and 217 aligned in the right-and-left direction. The left crank chamber 7*a* is defined between the left support wall portion 215 and the middle support wall portion 216, and the right crank chamber 7*b* is defined between the middle support wall portion 216 and the right support wall portion 217.

The left crankpin 71*a*, and the pair of crank webs 73 sandwiching the left crankpin 71*a* are accommodated in the left crank chamber 7*a*, and the right crankpin 71*b*, and the pair of crank webs 73 sandwiching the right crankpin 71*b* are accommodated in the right crank chamber 7*b*. The left crank journal 75 is supported by the left support wall portion 215, and the middle crank journal 76 is supported by the middle support wall portion 216. The right crank journal 77 is supported by the right support wall portion 217.

The crankshaft 27 further includes a right extending portion 79 extending rightward from the right support wall portion 217 of the crankcase 21. A generator 11 is mounted to the right extending portion 79. A generator cover 12 is mounted to a right side surface of the crankcase 21, and a generator chamber 13 configured to accommodate the generator 11 therein is partitioned off in the crankcase 21.

A gear 16 and a gear 19 are mounted on a portion of the right extending portion 79 of the crankshaft 27 between the support wall portion 217 and the generator 11. The gear 16 is configured to drive, through a cam chain 15, a cam 252 mounted to the cylinder head 25. The gear 19 is configured to drive a pump unit (not shown) through a pump chain 18.

The crankshaft 27 further includes a left extending portion 78 extending leftward from the left support wall portion 215 of the crankcase 21. A centrifugal clutch 80 is arranged at a distal end portion of the left extending portion 78. The centrifugal clutch 80 is arranged coaxially with the crankshaft 27. A gap configured to position or accommodate the rear shaft 52 of the propeller shaft 50 therein, is formed between the left support wall portion 215 of the crankcase 21 and the centrifugal clutch 80.

A primary shaft 28 is arranged on the left side of the left extending portion 78, and the left extending portion 78 and the primary shaft 28 are coupled to each other through the centrifugal clutch 80. The centrifugal clutch 80 includes an inner clutch 81 and an outer clutch 83. The clutch inner 81 is mounted to the left extending portion 78, and the outer clutch 83 is mounted to the primary shaft 28. The centrifugal clutch 80 transmits the rotational power of the crankshaft 27 to the primary shaft 28 in such a manner that an outer peripheral surface of the inner clutch 81 is pressed to an inner peripheral surface of the outer clutch 83 by a centrifugal force accompanied with rotation of the crankshaft 27.

A clutch cover 85 is mounted to a left side surface of the crankcase 21, and a clutch chamber 87, configured to accommodate the centrifugal clutch 80 therein, is partitioned off in the crankcase 21. An annular edge portion 289 is formed on the left side surface of the crankcase 21 to extend leftward and surround the left extending portion 78. The clutch cover 85 is joined to (or extends to) the edge portion 289 to form the clutch chamber 87. The primary shaft 28 extends leftward from the clutch cover 85. A gap between the primary shaft 28 and the clutch cover 85 is sealed by a sealing member 88. A proximal end portion of the primary shaft 28, which is coupled to the outer clutch 83, is supported by the clutch cover 85 through intermediation of a bearing 89.

A belt type continuously variable transmission (CVT) 30 configured to transmit the rotational power from the engine 20 to the transmission 40 is arranged on the left side of the engine 20 and the transmission 40. The rotational power of the primary shaft 28 coupled to the crankshaft 27 of the engine 20 through the centrifugal clutch 80 is continuously varied by the belt type CVT 30, and then is transmitted to the secondary shaft 43 arranged in the transmission 40. The belt type CVT 30 includes a drive pulley 33 mounted to the primary shaft 28, a driven pulley 35 mounted to a left end portion of the secondary shaft 43, and a rubber belt 37 wound around the drive pulley 33 and the driven pulley 35. The belt 37 may be made of metal or a resin.

The belt type CVT 30 is accommodated in a CVT case 31 provided separately from the crankcase 21 and the transmission case 41. The CVT case 31 includes a left CVT case 31A and a right CVT case 31B that are dividable in the right-and-left direction. An annular edge portion 239 is formed on the left side surface of the crankcase 21 to extend leftward and surround the edge portion 289 forming the clutch chamber 87. A rear portion of the CVT case 31 is joined to the edge portion 239. An edge portion 419 is also formed on a left side surface of the transmission case 41 to extend leftward and surround the secondary shaft 43. A front portion of the CVT case 31 is joined to the edge portion 419.

The drive pulley 33 includes a stationary sheave 331 fixed to the primary shaft 28, and a movable sheave 333 mounted to the primary shaft 28 and movable in an axial direction. A weight 36 is arranged between the movable sheave 333 and a cam plate 34 fixed to the primary shaft 28. The weight 36 is configured to move the movable sheave 333 in the axial direction by the centrifugal force accompanied with rotation of the primary shaft 28. The distal end portion of the primary shaft 28 is supported through intermediation of a bearing 39 by a housing 32 formed inside the CVT case 31.

The driven pulley 35 includes a stationary sheave 351 fixed to the secondary shaft 43, and a movable sheave 353 mounted to the secondary shaft 43 and movable in the axial direction. A coil spring 38 applies pressure to the movable sheave 353 in a direction toward the stationary sheave 351.

The transmission 40 changes the rotational power of the secondary shaft 43 to any one of a high mode, a low mode, and a reverse mode, and then transmits the rotational power to the transmission shaft 45. The transmission 40 further transmits the rotational power, which has transmitted to the transmission shaft 45, from the output shaft 47 to the propeller shaft 50. The transmission 40 is accommodated in the transmission case 41 provided separately from the crankcase 21 and the CVT case 31. The transmission case 41 includes a left transmission case 41A and a right transmission case 41B that are dividable in the right-and-left direction (direction of the axis).

A low drive gear 43*a*, a high drive gear 43*b*, and a reverse drive gear 43*c* are formed integrally with the secondary shaft 43. A low driven gear 45*a*, a high driven gear 45*b*, and a reverse driven gear 45*c* are mounted to the transmission shaft 45 and are rotatable relative to one another. The low drive gear 43*a* and the low driven gear 45*a* mesh with each other, and the high drive gear 43*b* and the high driven gear 45*b* mesh with each other. Further, the reverse drive gear 43*c* and the reverse driven gear 45*c* respectively mesh with gears formed on a countershaft (not shown).

Dog clutches 451 and 453 are mounted to the transmission shaft 45 and are rotatable relative to one another in their axial direction. Further, a drive gear 45*d* is spline-connected to the transmission shaft 45. When the dog clutch 451 meshes with the low driven gear 45*a*, the transmission shaft 45 is rotated together with the low driven gear 45*a*. When the dog clutch 453 meshes with the high driven gear 45*b*, the transmission shaft 45 is rotated together with the high driven gear 45*b*. When the dog clutch 451 meshes with the reverse driven gear 45*c*, the transmission shaft 45 is rotated together with the reverse driven gear 45*c*.

A driven gear 47*d*, which meshes with the drive gear 45*d* of the transmission shaft 45, is spline-connected to the output shaft 47, and the rotational power of the transmission shaft 45 is transmitted to the output shaft 47. Further, a bevel gear 47*e* is spline-connected to the output shaft 47. A bevel gear 54*e*, which meshes with the bevel gear 47*e* of the output shaft 47, is spline-connected to the front shaft 54 of the propeller shaft 50 arranged in the transmission case 41, and the rotational power of the output shaft 47 is transmitted to the front shaft 54.

The front shaft 54 is arranged in the transmission case 41 to pass through the transmission case 41 in the fore-and-aft direction, and the rear shaft 52 is arranged in the crankcase 21 to pass through the crankcase 21 in the fore-and-aft direction. The front shaft 54 and the rear shaft 52 are coupled to each other, and thus construct the propeller shaft 50. Specifically, a front end portion of the rear shaft 52 protruding forward from the crankcase 21 is inserted into and spline-connected to a rear end portion of the front shaft 54 protruding rearward from the transmission case 41.

The rear end portion of the front shaft 54 is supported through intermediation of a bearing 493 by an annular shaft support portion 413 formed on a rear wall of the transmission case 41. A gap between the rear end portion of the front shaft 54 and the shaft support portion 413 is sealed by a sealing member 495. The front end portion of the rear shaft 52 is supported through intermediation of a bearing 283 by an annular shaft support portion 211 formed on a front wall of the crankcase 21. A gap between the front end portion of the rear shaft 52 and the shaft support portion 211 is sealed by a sealing member 285.

An annular shaft support portion 411, which protrudes forward, is formed on a front wall of the transmission case 41. Annular cap 481 is fitted inside the shaft support portion 411. A front end portion of the front shaft 54 is supported through intermediation of a bearing 483 by the cap 481 fitted inside the shaft support portion 411. A gap between the front end portion of the front shaft 54 and the cap 481 is sealed by a sealing member 485. A coupling member 541 is mounted to the front end portion of the front shaft 54. The front propeller shaft 122 (see FIG. 1) is coupled to the coupling member 541.

An annular shaft support portion 213, which protrudes rearward, is formed on a rear wall of the crankcase 21. A rear end portion of the rear shaft 52 is supported by the shaft support portion 213 through intermediation of a bearing 293. A gap between the rear end portion of the rear shaft 52 and the shaft support portion 213 is sealed by a sealing member 295. A coupling member 521 is mounted to the rear end portion of the rear shaft 52. The rear propeller shaft 132 (see FIG. 1) is coupled to the coupling member 521.

Now, with reference to FIG. 5, a positional relationship of the propeller shaft 50 in the crankcase 21 is described in detail. FIG. 5 is an illustration of a state in which the outer peripheral surface of the inner clutch 81 is pressed to the inner peripheral surface of the outer clutch 83 on the lower side with respect to the axis of the crankshaft 27 (side indicated by the arrow D).

In this embodiment, the rear shaft 52 of the propeller shaft 50 passing through the crankcase 21 is located between the centrifugal clutch 80 and the left support wall portion 215 configured to support the crank journal 75 and above a lower end Ho of the centrifugal clutch 80. Herein, the lower end, Ho, of the centrifugal clutch 80 refers to a lower end of the outer clutch 83.

Further, the rear shaft 52 may be located above a lower end, Hi, of the inner clutch 81 when the crankshaft 27 is not rotated. The inner clutch 81 includes a disc-like plate 812, a support shaft 813 fixed to the plate 812, a shoe 814 supported by the plate 812 so as to be movable in a radial direction, and a coil spring 816 stretched between the support shaft 813 and the shoe 814. When the crankshaft 27 is rotated so that the centrifugal force applied to the shoe 814 exceeds a spring force of the coil spring 816, the shoe 814 is moved radially outward, and then pressed to the inner peripheral surface of the outer clutch 83. The lower end Hi of the inner clutch 81 refers to, for example, a lower end of the shoe 814 or a lower end of the plate 812 when the crankshaft 27 is not rotated.

Still further, the rear shaft 52 may be located above lower ends Hw of the crank webs 73 of the crankshaft 27. The lower ends Hw of the crank webs 73 are located above the lower end Ho of the centrifugal clutch 80. Herein, the lower ends Hw of the crank webs 73 refer to lower ends of the crank webs 73 when portions of the crank webs 73 farthest from the axis of the crankshaft 27 are located directly below the axis.

In the illustrated example, an entire part of the rear shaft 52 is located above the lower end Ho of the centrifugal clutch 80, the lower end Hi of the inner clutch 81, or the lower ends Hw of the crank webs 73, but the present embodiments are not limited thereto. For example, only a part of the rear shaft 52 may be located above the above-mentioned lower ends.

As described above, in this embodiment, the rear shaft 52 of the propeller shaft 50 is arranged between the support wall portion 215 and the centrifugal clutch 80 and above the lower end Ho of the centrifugal clutch 80. With this arrangement, the left extending portion 78 of the crankshaft 27 can be arranged closer to the rear shaft 52 of the propeller shaft 50. Accordingly, a position of the engine 20 is lowered, thereby lowering a center of gravity of the vehicle 100.

Figure 7:
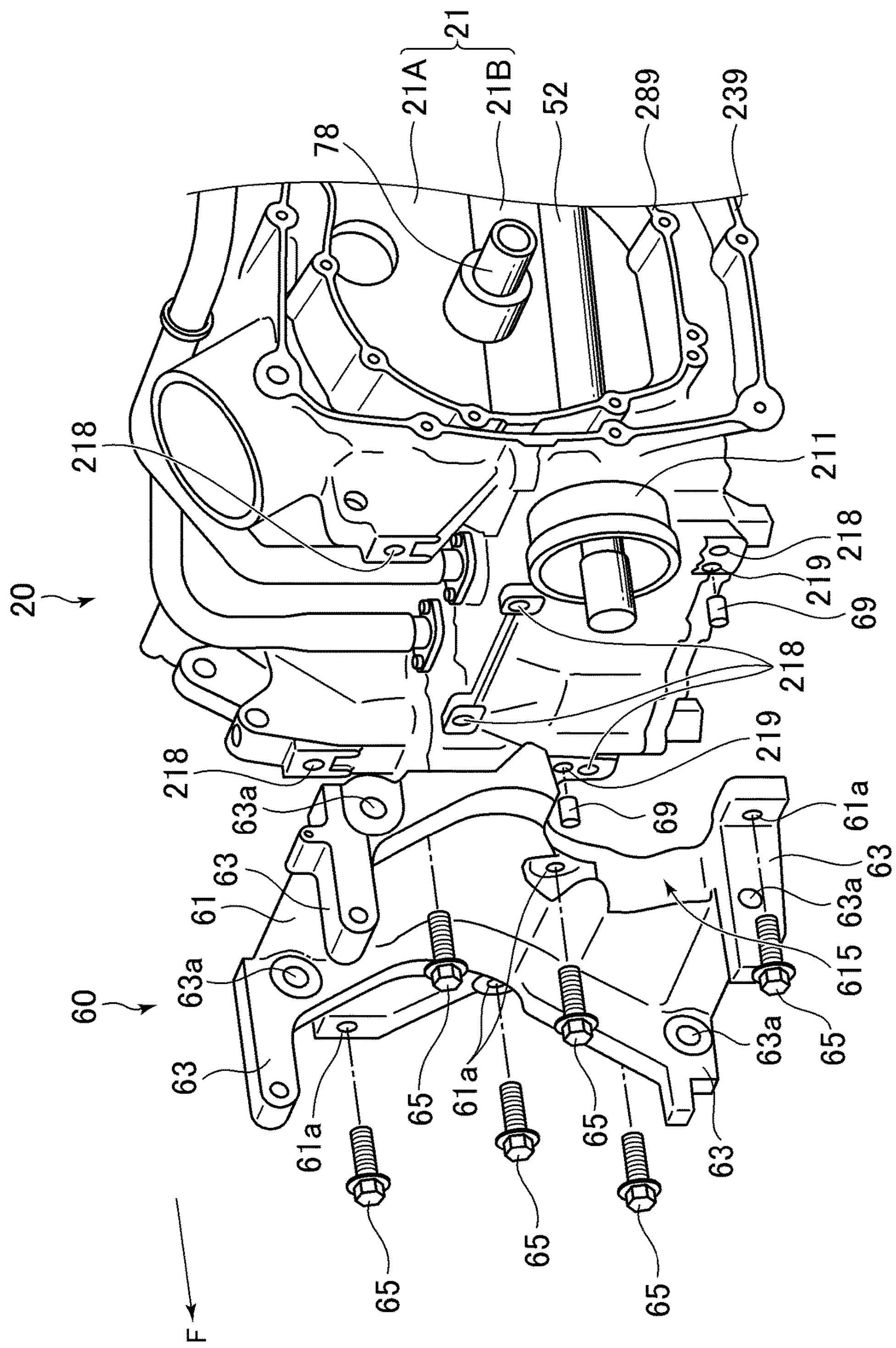
FIG. 7 is a perspective view for illustrating a first step of assembling the engine unit.
Figure 8:
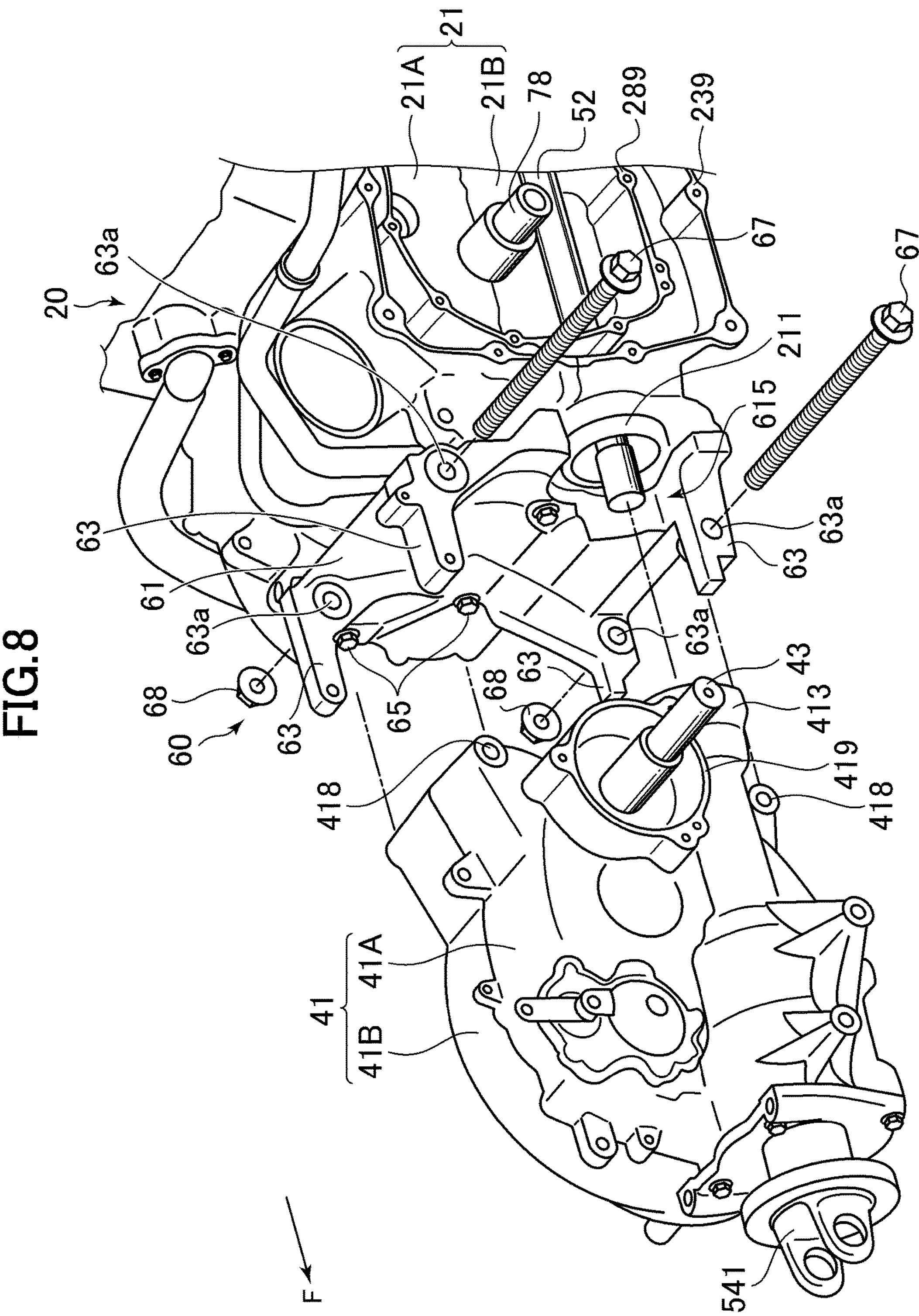
FIG. 8 is a perspective view for illustrating a second step of assembling the engine unit.

Now, with reference to FIG. 6 through FIG. 8, assembly of the engine unit 10 is described in detail. FIG. 7 and FIG. 8 are perspective views for respectively illustrating a first step and a second step of assembling the engine unit 10. In the first step, the adapter 60 is mounted to the crankcase 21. In the second step, the transmission case 41 is mounted to the adapter 60.

As illustrated in FIG. 6, the annular shaft support portion 211 is formed on the front wall of the crankcase 21 to protrude forward. A through-hole 21*c*, through which the rear shaft 52 passes, is formed inside the shaft support portion 211. The front end portion of the rear shaft 52 protrudes forward from the shaft support portion 211. The rear shaft 52 is supported inside the shaft support portion 211 through intermediation of the bearing 283. A gap between the through-hole 21*c* and the rear shaft 52 is sealed by the sealing member 285. Further, an annular recessed portion 215 is formed in a front end portion of the shaft support portion 211 to surround the rear shaft 52.

Meanwhile, the annular shaft support portion 413 is formed on the rear wall of the transmission case 41 to protrude rearward. A through-hole 41*c*, through which the front shaft 54 passes, is formed inside the shaft support portion 413. The rear end portion of the front shaft 54 protrudes rearward from the shaft support portion 413. The front shaft 54 is supported inside the shaft support portion 413 through intermediation of the bearing 493. A gap between the through-hole 41*c* and the front shaft 54 is sealed by the sealing member 495. Further, an annular recessed portion 415 is formed in a rear end portion of the shaft support portion 413 to surround the front shaft 54.

As illustrated in FIG. 7, a plurality of screw holes 218 for fastening the adapter 60 with screws are formed in the front wall of the crankcase 21. Further, a plurality of pin holes 219, in which positioning pins 69 are inserted, are also formed in the front wall of the crankcase 21.

Meanwhile, the adapter 60 includes a main body portion 61 having a substantially rectangular plate-like shape. A plurality of screw holes 61*a* are formed in the main body portion 61 to correspond to the screw holes 218 of the crankcase 21. The screw holes 61*a* pass through the main body portion 61 in a thickness direction of the main body portion 61, that is, in the fore-and-aft direction. A plurality of pin holes (not shown), in which the positioning pins 69 are inserted, are also formed in a rear surface of the main body portion 61. Further, a cutout portion 615 having a substantially semicircular shape or a substantially C-shape is formed in the main body portion 61 so as to avoid a front portion of the shaft support portion 211.

While the adapter 60 is positioned on the crankcase 21 by the positioning pins 69 in the up-and-down direction and the right-and-left direction, the adapter 60 is fixed to the front wall of the crankcase 21 with screws 65 inserted in the screw holes 61*a* and 218.

Further, the adapter 60 includes a plurality of protruding portions 63 protruding forward and respectively from four corner portions of the main body portion 61 having the substantially rectangular plate-like shape. The pair of protruding portions 63 formed at an upper end portion of the main body portion 61 are separated from each other in the right-and-left direction, and the pair of protruding portions 63 formed at a lower end portion of the main body portion 61 are also separated from each other in the right-and-left direction. A screw hole 63*a* is formed in each of the protruding portions 63 to pass through each of the protruding portions 63 in the right-and-left direction.

As illustrated in FIG. 8, screw holes 418 are respectively formed in a rear upper end portion and a rear lower end portion of the transmission case 41 to pass through the transmission case 41 in the right-and-left direction. The rear upper end portion and the rear lower end portion of the transmission case 41 are arranged between the right and left pairs of protruding portions 63 formed on the upper end portion and the lower end portion of the adapter 60, and are fixed to the adapter 60 with bolts 67 each inserted in the two screw holes 63*a* and the screw hole 418 between the two screw holes 63*a*, and with nuts 68 threadedly mounted to distal end portions of the bolts 67, respectively.

At this time, the shaft support portion 413 of the transmission case 41 is inserted inside the cutout portion 615 of the adapter 60, and abuts the shaft support portion 211 of the crankcase 21. That is, although the adapter 60 is interposed between the crankcase 21 and the transmission case 41, the shaft support portions 211 and 413 are coupled to each other in a direct contact state. As illustrated in FIG. 6, the shaft support portions 211 and 413 are held in direct contact with each other so that an annular rear edge of the shaft support portion 413 and an annular front edge of the shaft support portion 211 are joined to each other. In this manner, the crankcase 21 and the transmission case 41 are positioned in the fore-and-aft direction.

Further, as illustrated in FIG. 6, a common collar 69 is fitted into the shaft support portion 211 of the crankcase 21 and the shaft support portion 413 of the transmission case 41. Specifically, the collar 69 is fitted into both the recessed portion 215 formed in the front end portion of the shaft support portion 211, and the recessed portion 415 formed in the rear end portion of the shaft support portion 413. That is, a rear half of the collar 69 is fitted into the recessed portion 215 of the shaft support portion 211, and a front half of the collar 69 is fitted into the recessed portion 415 of the shaft support portion 413. In this manner, the crankcase 21 and the transmission case 41 are also positioned in the up-and-down direction and the right-and-left direction.

Further, when the crankcase 21 and the transmission case 41 are coupled to each other through intermediation of the adapter 60, the front end portion of the rear shaft 52 arranged in the crankcase 21, and the rear end portion of the front shaft 54 arranged in the transmission case 41 are spline-connected to each other inside the shaft support portions 211 and 413 so that the rear shaft 52 and the front shaft 54 can transmit the rotational power therebetween. In this manner, the rear shaft 52 and the front shaft 54 are integrated with each other to construct the propeller shaft 50 passing through the entire engine unit 10.

As described above, in this embodiment, the crankcase 21 and the transmission case 41 are formed separately from each other. In this case, as compared to a case where components constructing the crankcase 21 and components constructing the transmission case 41 are formed integrally with each other, the components are down sized. Along with down sizing of the components, dies for manufacturing the components are also down sized. Thus, manufacturing cost can be reduced.

Further, in this embodiment, the rear shaft 52 arranged in the crankcase 21, and the front shaft 54 arranged in the transmission case 41 are coupled to each other so as to be able to transmit the rotational power therebetween. With this configuration, when the crankcase 21 and the transmission case 41 are coupled to each other after assembly of the engine 20 and the transmission 40, the rear shaft 52 and the front shaft 54 can be coupled to each other. Thus, assembly can be facilitated.

Further, in this embodiment, the gap between the rear shaft 52 and the through-hole 21*c* formed in the crankcase 21 is sealed by the sealing member 285, and the gap between the front shaft 54 and the through-hole 41*c* formed in the transmission case 41 is sealed by the sealing member 495. With this configuration, the engine 20 and the transmission 40 can use different oils, for example, each of the engine 20 and the transmission 40 can use a suitable oil.

Further, in this embodiment, the crankcase 21 has a configuration dividable in the up-and-down direction, and the transmission case 41 has a configuration dividable in the right-and-left direction. That is, in this embodiment, the crankcase 21 and the transmission case 41 are formed separately from each other, and thus are dividable in different directions.

In particular, the engine 20 is the parallel two-cylinder engine. Thus, the up-and-down direction is suitable as a direction of dividing the crankcase 21. Meanwhile, the transmission 40 includes the plurality of shafts 43, 45, and 47. Thus, the right-and-left direction is suitable as a direction of dividing the transmission case 41. That is, a suitable dividing direction can be applied to each of the crankcase 21 and the transmission case 41.

Further, in this embodiment, the crankcase 21 and the transmission case 41 are coupled to each other through intermediation of the adapter 60. With this configuration, assembly can be facilitated. In particular, the screws 65 are inserted in the fore-and-aft direction when the adapter 60 is fixed to the crankcase 21, whereas the bolts 67 are inserted in the right-and-left direction when the transmission case 41 is fixed to the adapter 60. In other words, the screws 65 and the bolts 67 are inserted in different directions. Thus, assembly is facilitated.

Further, in this embodiment, under a state in which the shaft support portion 211 (projecting portion) formed on the front wall of the crankcase 21 to protrude forward, and the shaft support portion 413 (projecting portion) formed on the rear wall of the transmission case 41 to protrude rearward are held in contact with each other, the crankcase 21 and the transmission case 41 are coupled to each other through intermediation of the adapter 60. With this configuration, the crankcase 21 and the transmission case 41 can be positioned in the fore-and-aft direction.

Further, in this embodiment, the collar 69 is arranged to be fitted into both the recessed portion 215 formed in the shaft support portion 211 to surround the rear shaft 52, and the recessed portion 415 formed in the shaft support portion 413 to surround the front shaft 54. With this configuration, the crankcase 21 and the transmission case 41 can be positioned in the up-and-down direction and the right-and-left direction.

Further, in this embodiment, as illustrated in FIG. 3, the secondary shaft 43 (input shaft) and the transmission shaft 45 of the transmission 40 are aligned in the fore-and-aft direction. That is, at least a part of the secondary shaft 43 and at least a part of the transmission shaft 45 are arranged at the same height. In the illustrated example, nearly all parts of the two shafts 43 and 45 are aligned in the fore-and-aft direction at the same height. An axis of the transmission shaft 45 is located slightly above an axis of the secondary shaft 43.

When the secondary shaft 43 and the transmission shaft 45 are aligned and arranged in the fore-and-aft direction in the above-mentioned manner, a height of the transmission 40 can be reduced. As a result, as illustrated in FIG. 1, when the transmission 40 is arranged below the seat portions 111 of the front row seats 110 of the vehicle 100, heights of the seat portions 111 can be lowered.

Although embodiments of the present invention have been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A vehicle, comprising:
an engine, the engine comprising:
a crankshaft;
a crankcase, which is configured to accommodate the crankshaft therein; and
a centrifugal clutch, which is arranged coaxially with the crankshaft; and
a propeller shaft;
a transmission which receives rotational power of the engine through the centrifugal clutch to transmit the rotational power to the propeller shaft and which changes a rotational speed of the propeller shaft; and
wherein the propeller shaft passes through the crankcase and intersects the crankshaft in a plan view, and wherein at least a part of the propeller shaft is located between the centrifugal clutch and a support wall portion of the crankcase configured to support the crankshaft and above a lower end of the centrifugal clutch.

2. The vehicle according to claim 1, wherein at least the part of the propeller shaft is located above a lower end of a crank web of the crankshaft.

3. The vehicle according to claim 1, wherein the propeller shaft is arranged below the crankshaft.

4. The vehicle according to claim 1, wherein the crankshaft extends in a right-and-left direction of the vehicle, and the propeller shaft extends in a fore-and-aft direction of the vehicle.

5. The vehicle according to claim 1, further comprising:
a transmission case, which is configured to accommodate the transmission therein, and is provided separately from the crankcase.

6. The vehicle according to claim 5, further comprising a belt type continuously variable transmission, which is configured to transmit the rotational power from the engine to the transmission.

7. The vehicle according to claim 6, wherein the belt type continuously variable transmission comprises a primary shaft arranged coaxially with the crankshaft.

8. The vehicle according to claim 5,
wherein the propeller shaft comprises a first shaft passing through the crankcase, and a second shaft passing through the transmission case, and the rotational power from the transmission is transmitted to the second shaft, and
wherein the first shaft and the second shaft are coupled to each other so as to be configured to transmit the rotational power therebetween.

9. The vehicle according to claim 8, further comprising:
a first sealing member, which is configured to seal a gap between a first through-hole formed in the crankcase, and the first shaft passing through the first through-hole; and a second sealing member, which is configured to seal a gap between a second through-hole formed in the transmission case, and the second shaft passing through the second through-hole.

10. The vehicle according to claim 5, wherein the crankcase is dividable in an up-and-down direction of the vehicle, and wherein the transmission case is dividable in a right-and-left direction of the vehicle.

11. The vehicle according to claim 5, wherein the crankcase and the transmission case are coupled to each other through intermediation of an adapter.

12. The vehicle according to claim 11, further comprising:

a first projecting portion, which is formed on an outer wall of the crankcase to protrude to an outside of the crankcase; and a second projecting portion, which is formed on an outer wall of the transmission case to protrude to an outside of the transmission case, wherein the crankcase and the transmission case are coupled to each other through intermediation of the adapter under a state in which the first projecting portion and the second projecting portion are held in contact with each other.

13. The vehicle according to claim 8, further comprising:

a first recessed portion, which is formed in an outer wall of the crankcase to surround the first shaft protruding to an outside of the crankcase;

a second recessed portion, which is formed in an outer wall of the transmission case to surround the second shaft protruding to an outside of the transmission case; and a collar, which is fitted in both the first recessed portion and the second recessed portion.

14. The vehicle according to claim 5, wherein the transmission comprises an input shaft to which the rotational power from the engine is input, an output shaft configured to transmit the rotational power to the propeller shaft, and a transmission shaft interposed between the input shaft and the output shaft, and wherein the input shaft and the transmission shaft are aligned in a fore-and-aft direction of the vehicle.

15. The vehicle according to claim 1, further comprising a plurality of seats, which are aligned in a right-and-left direction of the vehicle.

16. The vehicle according to claim 5, further comprising a plurality of seats, which are aligned in a right-and-left direction of the vehicle, wherein the transmission case is arranged below seat portions of the plurality of seats.

17. The vehicle according to claim 1, further comprising:

a plurality of first row seats, which are aligned in a right-and-left direction of the vehicle; and a plurality of second row seats, which are aligned in the right-and-left direction of the vehicle and arranged behind the plurality of first row seats, wherein at least a part of the engine is located between the plurality of first row seats and the plurality of second row seats.

18. An engine unit, comprising:

a crankshaft;

a crankcase, which is configured to accommodate the crankshaft therein;

a centrifugal clutch, which is arranged coaxially with the crankshaft and is connected to the crankshaft;

a first shaft passing through the crankcase and intersecting the crankshaft in a plan view, at least a part of the first shaft being located between the centrifugal clutch and a support wall portion of the crankcase configured to support the crankshaft and above a lower end of the centrifugal clutch; and a transmission, which is configured to transmit rotational power from a centrifugal clutch to the first shaft.

19. The engine unit according to claim 18, further comprising:

a second shaft coupled to the first shaft so that the first shaft and the second shaft are able to transmit the rotational power therebetween, a transmission case, which is configured to accommodate the transmission therein, and is provided separately from the crankcase;

wherein the transmission is configured to change a rotational speed of the second shaft and the first shaft; and the second shaft passes through the transmission case.

* * * * *